(12) United States Patent
Lee

(10) Patent No.: US 7,174,623 B2
(45) Date of Patent: Feb. 13, 2007

(54) METHOD OF PROVIDING PROTECTION TO THE POLE PIECE OF A MAGNETIC HEAD DURING ITS MANUFACTURE WITH USE OF A SELECTIVELY ETCHABLE MATERIAL

(75) Inventor: Edward Hin Pong Lee, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 48 days.

(21) Appl. No.: 10/825,507

(22) Filed: Apr. 15, 2004

(65) Prior Publication Data
US 2005/0011064 A1 Jan. 20, 2005

Related U.S. Application Data

(62) Division of application No. 10/156,633, filed on May 28, 2002, now Pat. No. 6,848,166.

(51) Int. Cl.
*G11B 5/127* (2006.01)
*H04R 31/00* (2006.01)

(52) U.S. Cl. .............. 29/603.14; 29/603.07; 29/603.13; 29/603.15; 29/603.16; 29/603.18; 205/119; 205/122; 360/121; 360/122; 360/126; 360/317; 451/5; 451/41

(58) Field of Classification Search ............ 29/603.07, 29/603.13–603.16, 603.18; 205/199, 122; 306/121, 122, 123, 126, 317; 451/5, 41
See application file for complete search history.

(56) References Cited

U.S. PATENT DOCUMENTS 5,155,646 A 10/1992 Fujisawa et al.

(Continued)

FOREIGN PATENT DOCUMENTS

JP 406004830 A 1/1991

(Continued)

OTHER PUBLICATIONS

"The effect of track width and topography on composition uniformity of electroplated Permalloy in thin film heads"; Sahami, S.; Lee, H.P.E.; Magnetics, IEEE Transactions on vol. 28, Issue 5, Part 2, Sep. 1992; pp. 2103-2105.*

(Continued)

*Primary Examiner*—Paul D. Kim
(74) *Attorney, Agent, or Firm*—John J. Oskorep, Esq.; Matthew Zises (57) ABSTRACT

A method of making a magnetic head involves providing a partially constructed magnetic head which has a top surface formed by a front P2 pole tip, a back gap P2 pedestal, and insulator materials disposed between the front P2 pole tip and the back gap P2 pedestal; forming a layer of selectively etchable materials over the top surface of the partially constructed magnetic head, the layer having a front edge that is recessed away from an air bearing surface (ABS); forming additional insulator materials over the selectively etchable material layer and over a front portion of the front P2 pole tip; performing a chemical-mechanical polishing (CMP) to form a substantially coplanar top surface with the selectively etchable material layer and the additional insulator materials; etching to remove the selectively etchable material layer; and depositing yoke layer materials over the resulting structure.

17 Claims, 8 Drawing Sheets

U.S. PATENT DOCUMENTS

| | | | |
|---|---|---|---|
| 5,452,164 | A | 9/1995 | Cole et al. |
| 5,473,491 | A | 12/1995 | Fujisawa et al. |
| 5,649,351 | A | 7/1997 | Cole et al. |
| 5,996,213 | A | 12/1999 | Shen et al. |
| 6,195,229 | B1 | 2/2001 | Shen et al. |
| 6,201,670 | B1 | 3/2001 | Chang et al. |
| 6,301,084 | B1 | 10/2001 | Santini |
| 6,504,677 | B1 * | 1/2003 | Han et al. .................. 360/126 |
| 2001/0015871 | A1 | 8/2001 | Niwa |

FOREIGN PATENT DOCUMENTS

| | | |
|---|---|---|
| JP | 03-275249 | 12/1991 |

OTHER PUBLICATIONS

R.T. Campbell, V. Escalante, R. Lee and J.Lo, Perfectly Aligned Pole Tips By Using Full Film P2 Process With Al2O3 Protection Layer, Research Disclosure, Apr. 1987, No. 276, Kenneth Mason Publications Ltd., England.

Yingjian Chen; Liu, F.; Stoev, K.; Xiaozhong Dang; Hua-Ching Tong; Qing He; Yiming Huai; "High-performance writer using high-moment sputtered fields in top and bottom poles"; IEEE Transactions on, vol. 38, Issue: Sep. 5, 2002.

Preliminary amendment for divisional application U.S. Appl. No. 10/156,633.

* cited by examiner

METHOD OF PROVIDING PROTECTION TO THE POLE PIECE OF A MAGNETIC HEAD DURING ITS MANUFACTURE WITH USE OF A SELECTIVELY ETCHABLE MATERIAL

CROSS-REFERENCE TO RELATED APPLICATION

This application is a divisional application of U.S. patent application having Ser. No. 10/156,633 filed on May 28, 2002 now U.S. Pat. No. 6,848,166 entitled "Method Of Protecting The Pole Piece Of A Magnetic Head During The Ion Mill Patterning Of The Yoke".

BACKGROUND OF THE INVENTION

1. Field of the Invention

This invention relates generally to methods of making magnetic heads, and more particularly to methods of making magnetic heads which protect the P2 pole piece during the ion mill patterning of the yoke.

2. Description of the Related Art

A write head is typically combined with a magnetoresistive (MR) or giant magnetoresistive (GMR) read head to form a read/write recording head, certain elements of which are exposed at an air bearing surface (ABS). The write head is made of first and second pole pieces having first and second pole tips, respectively, which terminate at the ABS. The first and second pole pieces are connected at the back gap, whereas the first and second pole tips are separated by a non-magnetic gap layer. An insulation stack, which comprises a plurality of insulation layers, is sandwiched between the first and second pole pieces, and a coil layer is embedded in this insulation stack. A processing circuit is connected to the coil layer for conducting write current through the coil layer which, in turn, induces write fields in the first and second pole pieces. Thus, write fields of the first and second pole tips at the ABS fringe across the gap layer. In a magnetic disk drive, a magnetic disk is rotated adjacent to, and a short distance from, the ABS so that the write fields magnetize the disk along circular tracks. The written circular tracks then contain information in the form of magnetized segments with fields detectable by the read head.

One or more merged heads may be employed in a magnetic disk drive for reading and writing information on circular tracks of a rotating disk. A merged head is mounted on a slider that is carried on a suspension. The suspension is mounted to an actuator which rotates the magnetic head to locations corresponding to desired tracks. As the disk rotates, an air layer (an "air bearing") is generated between the rotating disk and the ABS. A force of the air bearing against the air bearing surface is opposed by an opposite loading force of the suspension, causing the magnetic head to be suspended a slight distance (flying height) from the surface of the disk.

Improved methods for making magnetic heads have become increasingly important for proper head fabrication and performance. Magnetic head assemblies are typically made of multiple thin film layers which are patterned to form various shaped layers in the head. Some of the layers are electroplated, while other layers are sputter deposited on a wafer substrate.

The conventional method of forming a magnetic pole layer of a magnetic write head involves an electroplating deposition process. Deposition by electroplating, however, limits the choice of materials that can be used for such layers. For high data rate applications, the pole layer material (especially that in the yoke region) should be a highly resistive material or a laminated structure of alternating magnetic and dielectric layers. The yoke region of the pole layer is the region that resides between the pole tip and the back gap. These materials help reduce the eddy current effect and improve the high frequency performance of the write head. This highly resistive or laminated material can be deposited using dry process techniques, such as sputter deposition, where an ion milling process is subsequently used to pattern its shape.

Figure 1:
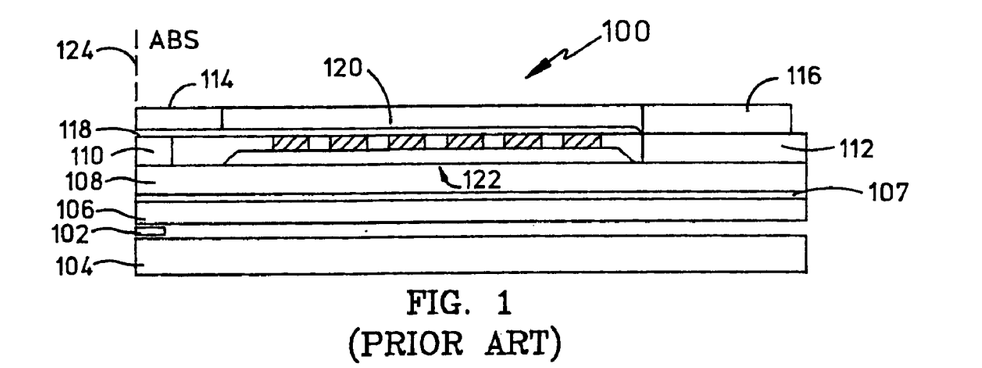
FIG. 1 is the first in a series of illustrations of FIGS. 1–3 which describe the problem of forming a yoke of a magnetic head by ion milling.

FIG. 1 is the first in a series of illustrations of FIGS. 1–3 which describe the problem of forming the yoke of a magnetic head by ion milling. In FIG. 1 a partially constructed magnetic head 100 is shown; it requires a yoke to be formed thereover to connect the pole pieces together in the back gap region. As partially constructed, magnetic head 100 includes a read sensor 102 formed between first and second shield layers 104 and 106. A first P1 pole piece layer 108 is plated over an insulator layer 107 which is on top of second shield layer 106. A front P1 pedestal 110 is then plated over this first P1 pole piece layer 108 at a contemplated air bearing surface (ABS) line 124, whereas a back gap P1 pedestal 112 is plated over first P1 pole piece layer 108 in the back gap region. First P1 pole piece layer 108, front P1 pedestal 110, and back gap P1 pedestal 112 form the first pole piece of magnetic head 100.

Formed between front and back gap P1 pedestals 110 and 112 are write coils 122 which are on top of and surrounded by an insulator material, such as hard bake resist or alumina ($Al_2O_3$). A gap layer 118 is formed over front P1 pedestal 110 and write coils 122. A front P2 pole tip 114 is then formed over gap layer 118 at the ABS line 124, whereas a back gap P2 pedestal 116 is formed over back gap P1 pedestal 112 in the back gap region. Front P2 pole tip 114 and back gap pedestal 116 form the second pole piece of magnetic head 100. An insulator material 120, such as alumina, is formed in between front P2 pole tip 114 and back gap P2 pedestal 116 over gap layer 118 and write coils 122.

Figure 2:
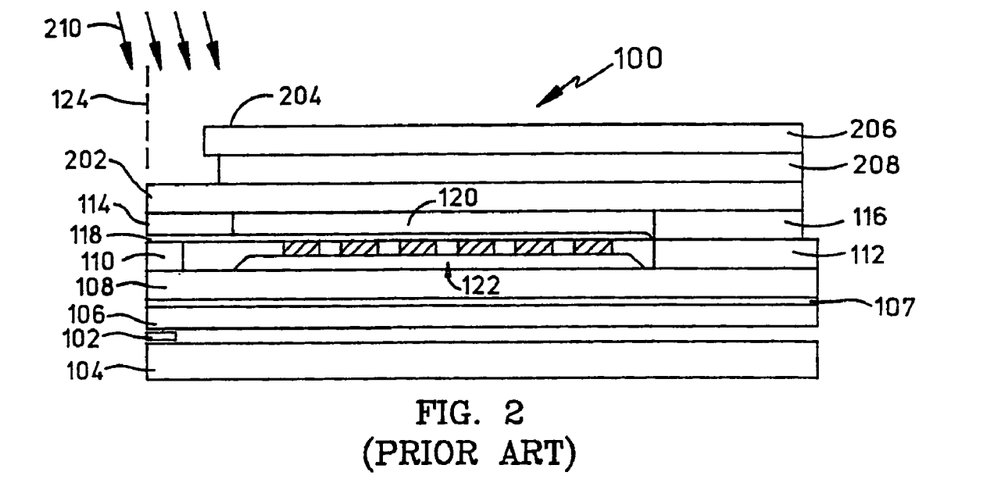
FIG. 2 is the second in a series of illustrations of FIGS. 1–3 which describe the problem of forming the yoke by ion milling, showing more particularly the ion milling process to remove the front portion of yoke layer materials which were formed by full-film sputter deposition.

In FIG. 2, yoke layer materials 202 are formed over the top surface of front P2 pole tip 114, back gap P2 pedestal 116, and insulator materials 120. Yoke layer materials 202 are made of either highly resistive magnetic materials or a laminated structure made of alternating magnetic and dielectric layers. Such materials are chosen to reduce or break up the effect of eddy currents which otherwise cause a relatively large loss of efficiency, especially at high data rate performance. However, the selection of these materials requires that they be sputter deposited as opposed to, for example, being electroplated. Therefore, due to the full-film sputter deposition of materials, yoke layer materials 202 typically have to be shaped by an ion milling process.

Before ion milling, a photoresist mask 204 is formed over yoke layer materials 202. The front edge of photoresist mask 204 is positioned such that it is recessed away from the ABS line 124 as shown. Photoresist mask 204 is made of a top photoresist layer 206 and a bottom release layer 208. An ion milling process as indicated by arrows 210 is then performed to remove that portion of yoke layer materials 202 that are not covered by photoresist mask 204. However, to guarantee that the uncovered yoke layer materials 202 are sufficiently removed, "over-milling" from between about 10–50% is typically required. Due to the shadowing effect from photoresist mask 204, it takes more time to clean materials at the foot of photoresist mask 204 which increases the total ion milling time.

Figure 3:
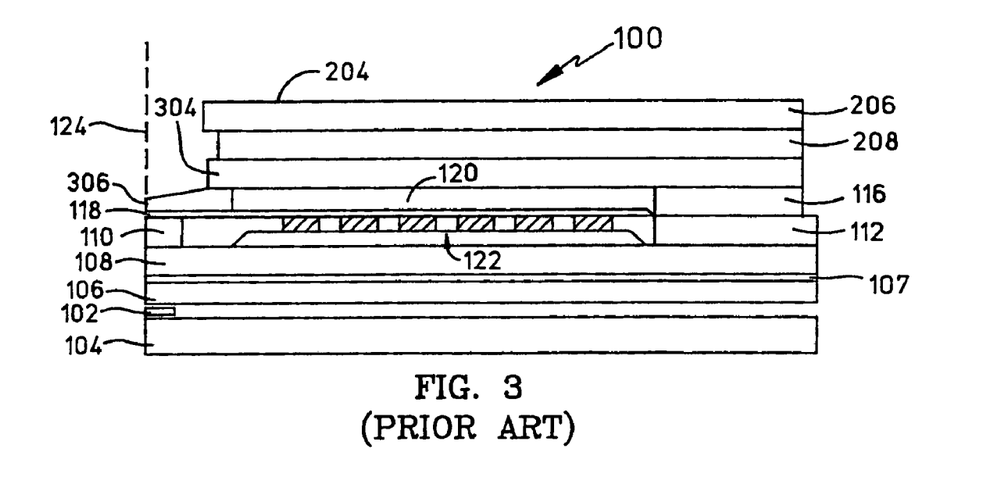
FIG. 3 is the third in a series of illustrations of FIGS. 1–3 which describe the problem of forming the yoke by ion milling, showing more particularly the reduced-size or damaged P2 pole piece as a result of the ion milling process of FIG. 2.

In FIG. 3, the front portion of the yoke layer materials is shown removed from the ion milling process. A yoke 304 is thereby formed over the front P2 pole tip and the back gap P2 pedestal. Photoresist mask 204 may be removed by dissolving photoresist layer 206 and release layer 208 with a suitable solvent, and conventional head processing may complete the formation of the head. Due to the required over-milling of yoke materials 202, however, a reduced-size or damaged front P2 pole tip 306 is produced as a result. Thus, it is difficult to control the thickness of the P2 pole piece with this process. If utilized in the magnetic head, such a damaged front P2 pole tip 306 will adversely affect the performance of the write head.

Accordingly, what is needed is a method of making a magnetic head which protects the P2 pole piece during the ion mill patterning of the yoke, or other methods which do not reduce the size or damage the P2 pole piece during formation of the yoke.

SUMMARY OF THE INVENTION

In one illustrative example of the present invention, a method of making a magnetic head involves providing a partially constructed magnetic head which has a top surface formed by a front P2 pole tip, a back gap P2 pedestal, and insulator materials disposed between the front P2 pole tip and the back gap P2 pedestal; forming a layer of selectively etchable materials over the top surface of the partially constructed magnetic head, the layer having a front edge that is recessed away from an air bearing surface (ABS); forming additional insulator materials over the selectively etchable material layer and over a front portion of the front P2 pole tip; performing a chemical-mechanical polishing (CMP) to form a substantially coplanar top surface with the selectively etchable material layer and the additional insulator materials; etching to remove the selectively etchable material layer; depositing yoke layer materials over the resulting structure; and performing a chemically-mechanically polishing (CMP) to form a substantially coplanar top surface with the yoke layer materials and the additional insulator materials, to thereby form a yoke.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENTS

The following description is the best embodiment presently contemplated for carrying out the present invention.

This description is made for the purpose of illustrating the general principles of the present invention and is not meant to limit the inventive concepts claimed herein.

Figure 4:
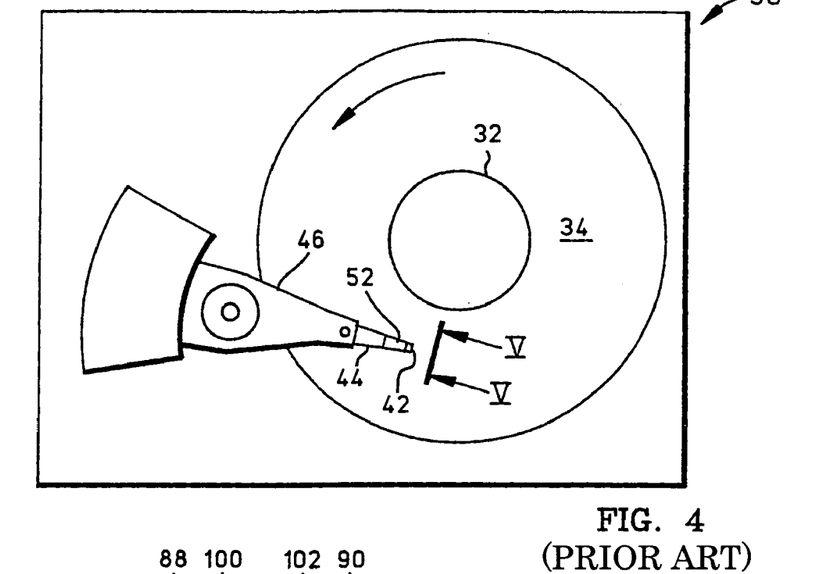
FIG. 4 is a planar view of a conventional magnetic disk drive.
Figure 5:
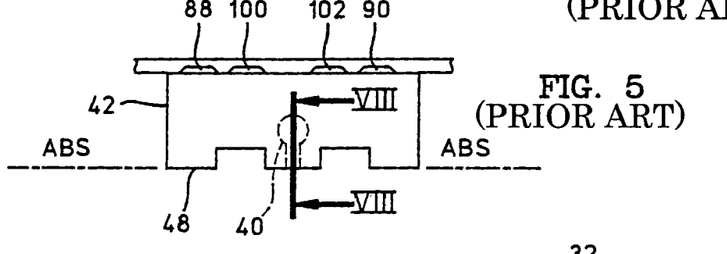
FIG. 5 is an end view of a slider with a magnetic head of the disk drive as seen in plane II—II of FIG. 4.
Figure 6:
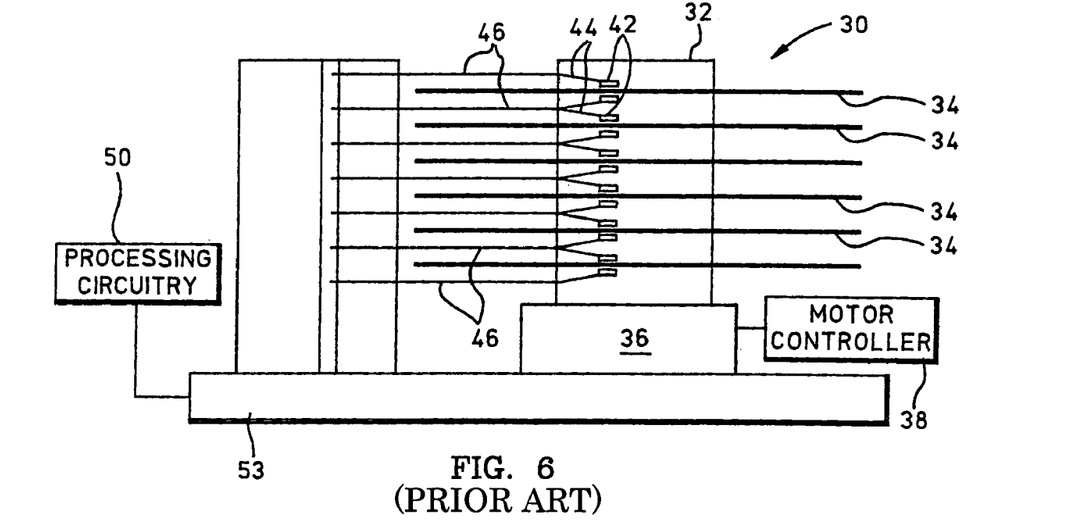
FIG. 6 is an elevation view of the magnetic disk drive wherein multiple disks and magnetic heads are employed.

Referring now to the drawings, wherein like reference numerals designate like or similar parts throughout the several views, there is illustrated in FIGS. 4–6 a conventional magnetic disk drive 30. The drive 30 includes a spindle 32 that supports and rotates a magnetic disk 34. The spindle 32 is rotated by a motor 36 that, in turn, is controlled by a motor controller 38. A horizontal combined magnetic head 40 for reading and recording is mounted on a slider 42. The slider 42 is supported by a suspension 44 and actuator arm 46. A plurality of disks, sliders and suspensions may be employed in a large capacity direct access storage device (DASD), as shown in FIG. 6. The suspension 44 and actuator arm 46 position the slider 42 to locate the magnetic head 40 in a transducing relationship with a surface of the magnetic disk 34. When the disk 34 is rotated by the motor 36, the slider is supported on a thin (typically, 0.05 μm) cushion of air (air bearing) between the disk and an air bearing surface (ABS) 48.

Figure 7:
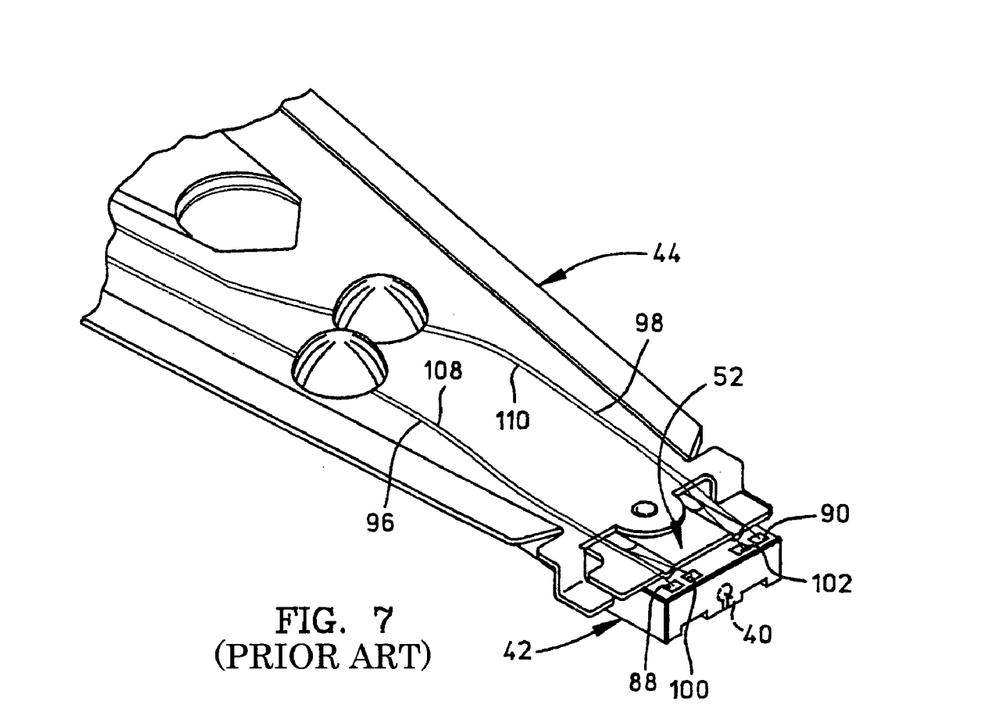
FIG. 7 is an isometric illustration of an exemplary suspension system for supporting the slider and magnetic head.

The magnetic head 40 may be employed for writing information to multiple circular tracks on the surface of the disk 34, as well as for reading information therefrom. Processing circuitry 50 exchanges signals representing such information with the head 40, provides motor drive signals, and also provides control signals for moving the slider 42 to various tracks. In FIGS. 4 and 7 the slider 42 is shown mounted to a head gimbal assembly (HGA) 52 that is mounted to the suspension 44. All of the above components are supported on a base 53.

Figure 8:
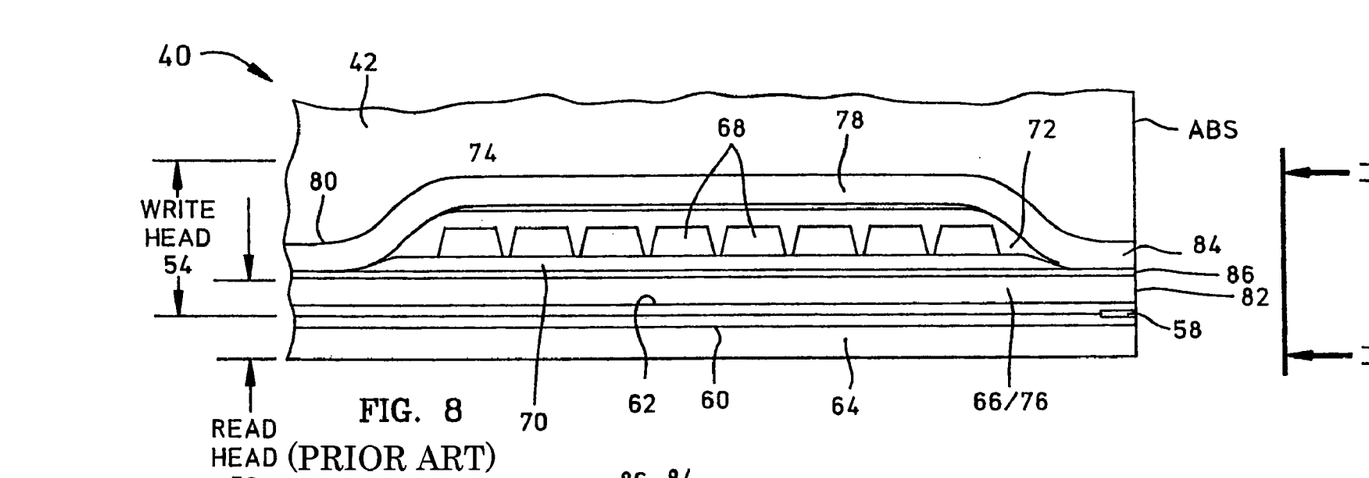
FIG. 8 is a partial elevation view of the slider and magnetic head as seen in plane V—V of FIG. 5.

FIG. 8 is a side cross-sectional elevation view of a conventional magnetic head 40 having a write head portion 54 and a read head portion 56. The read head portion includes a read sensor 58. The read sensor 58 is sandwiched between first and second gap layers 60 and 62 that are, in turn, sandwiched between first and second shield layers 64 and 66. In response to external magnetic fields, the resistance of the read sensor 58 changes. A sense current conducted through the sensor causes these resistance changes to be manifested as potential changes, which are processed by the processing circuitry 50 shown in FIG. 6.

Figure 9:
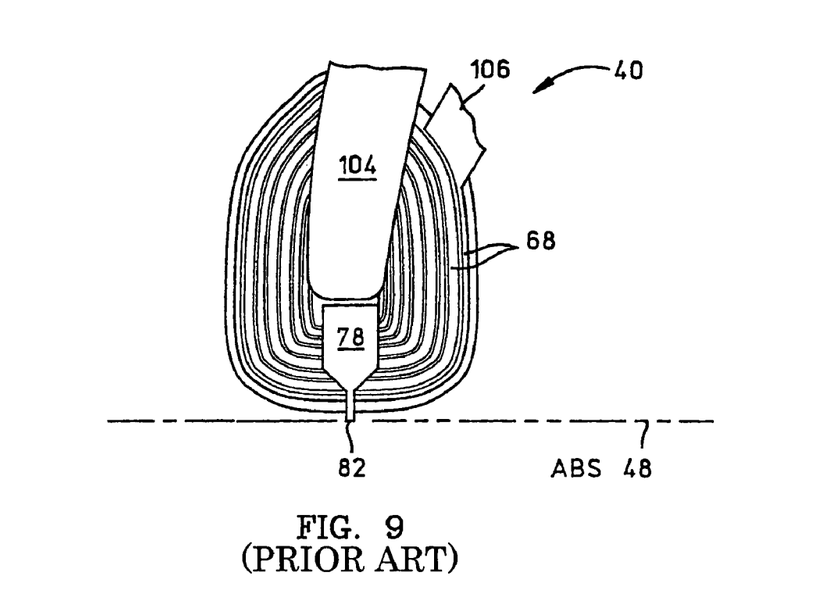
FIG. 9 is a top view of the second pole piece and coil layer, a portion of which is shown in FIG. 5, with all insulation material removed.
Figure 10:
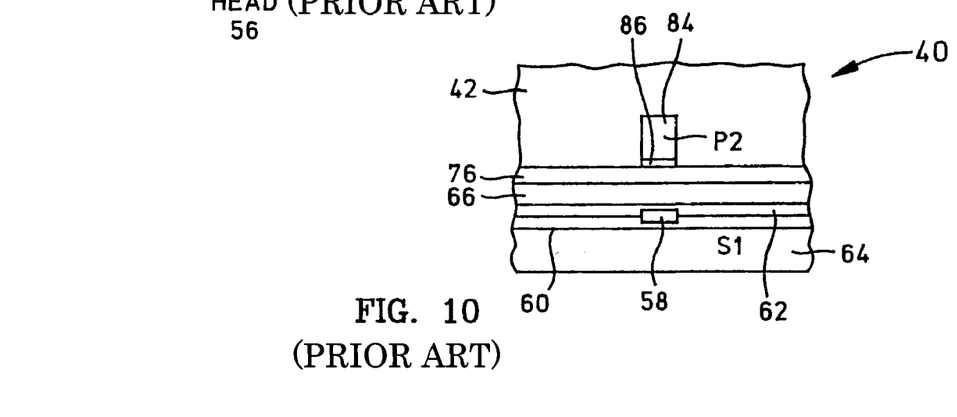
FIG. 10 is a partial ABS view of the slider taken along plane VII—VII of FIG. 8 to show the read and write elements of the magnetic head.

The write head portion 54 of the head includes a coil layer 68 sandwiched between first and second insulation layers 70 and 72. A third insulation layer 74 may be employed for planarizing the head to eliminate ripples in the second insulation layer caused by the coil layer 68. The first, second and third insulation layers are referred to as an "insulation stack". The coil layer 68, and the first, second and third insulation layers 70, 72 and 74, are sandwiched between first and second pole piece layers 76 and 78. The first and second pole piece layers 76 and 78 are magnetically connected at a back gap 80, and have first and second pole tips 82 and 84 that are separated by a non-magnetic gap layer 86 at the ABS. As shown in FIGS. 5 and 7, conductive pads 88, 90, 100, and 102 connect leads from the read sensor 58 and leads 104 and 106 from coil 68 (see FIG. 9) to leads 96, 98, 108, and 110 on the suspension 44.

FIGS. 11–15 are cross-sectional views of partially constructed magnetic heads for describing an inventive method of making a magnetic head which protects the P2 pole piece during the ion mill patterning of the yoke. The method of FIGS. 11–15 may be utilized for making a magnetic head in the disk drive described above in relation to FIGS. 4–10. This magnetic head will have a unique structure as shown and described later in relation to FIG. 15.

Figure 11:
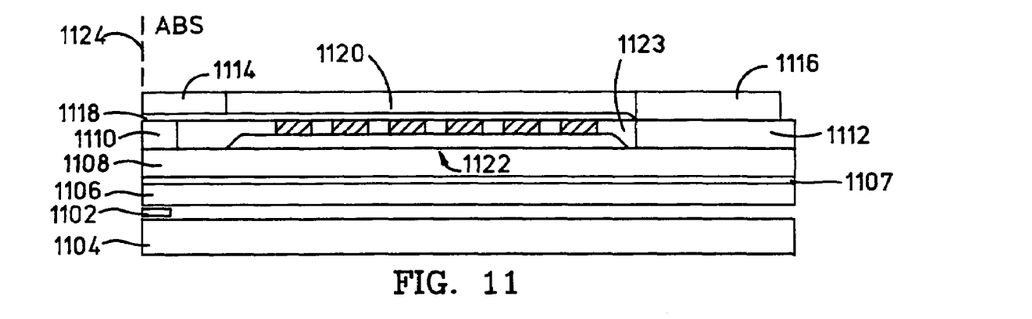
FIG. 11 is the first in a series of five illustrations of FIGS. 11–15 which describe a method of making a magnetic head which protects the P2 pole piece during ion mill patterning of the yoke.

In FIG. 11, a read sensor 1102 is formed between first and second shield layers 1104 and 1106 using conventional methods. A first pole piece layer 1108 ("P1") is then formed over an insulator layer 1107 which is on top of second shield layer 1106. This is done by electroplating. Next, write coils 1122 are formed behind the ABS 1124 on top of an insulator which is formed over first pole piece layer 1108. Write coils 1122 are protected with a surrounding insulator 1123, which may be a hard bake resist, alumina ($Al_2O_3$), or other suitable insulative material. Front P1 pedestal 1110 and back gap P1 pedestal 1112 are then frame plated over first pole piece layer 1108. Front P1 pedestal 1110 is plated as part of the P1 pole tip, whereas back gap P1 pedestal 1112 is plated in the back gap region. Alternatively, the pedestals may be plated prior to the formation of the coils and insulator.

Another insulator (not shown in FIG. 11), which may be alumina or other suitable insulative material, is then deposited over first pole piece layer 1108 and P1 pedestals 1110 and 1112. Next, a chemical mechanical polishing (CMP) is performed on a top surface of the structure to remove top insulator materials and to expose tops of P1 pedestals 1110 and 1112 such that the top surfaces of P1 pedestals 1110 and 1112, write coils 1122, and a resulting insulator layer 1123 are coplanar (as shown in FIG. 11). Alternatively, the coils are buried below the insulating material so that they are not exposed on the surface after the CMP step.

Next, a gap layer 1118 is formed over the top surfaces of front P1 pedestal 1110 and insulator material 1123. Front P2 pole tip 1114 and back gap P2 pedestal 1116 are then frame plated over gap layer 1118 and back gap P1 pedestal 1112, respectively. Front P2 pole tip 1114 is plated as part of the P2 pole tip, whereas back gap P2 pedestal 1116 is plated in the back gap region. Another insulator (not shown in FIG. 11), which may be alumina or other suitable insulative material, is then deposited over front P2 pole tip 1114, back gap P2 pedestal 1116, and gap layer 1118. Next, another CMP is performed on a top surface of the structure to remove top insulator materials and to expose tops of front P2 pole tip 1114 and back gap P2 pedestal 1116. This is done so that top surfaces of front P2 pole tip 1114, back gap P2 pedestal 1116, and a resulting insulator layer 1120 are coplanar. The resulting structure is shown in FIG. 11.

The first and the second pole pieces and pedestals may be made of any suitable magnetic material, preferably one with a high magnetic moment, such as various compositions of NiFe alloys or CoFe alloys, with the inclusion of other common additives or dopants to control its material properties. The thickness of first pole piece layer 1108 is between about 0.5–3.0 μm, and in the present embodiment has a thickness of about 1–2 μm. The thickness or height of front and back gap P1 pedestals 1110 and 1112 is preferably between about 1–3 μm, and in the present embodiment has a particular thickness of about 2 μm. The width of front P1 pedestal 1110 is preferably greater than 2 μm. The thickness or height of front P2 pole tip 1114 and back gap P2 pedestal 1116 is preferably between about 0.5 and 4.0 μm, and in the present embodiment has a particular thickness of about 2.0 μm. Gap layer 1118 may be made of alumina ($Al_2O_3$) or other suitable non-magnetic material. The thickness of gap layer 1118 preferably varies between about 200 and 2000 Angstroms, and in the present embodiment it has a thickness of about 1000 Angstroms.

Figure 12:
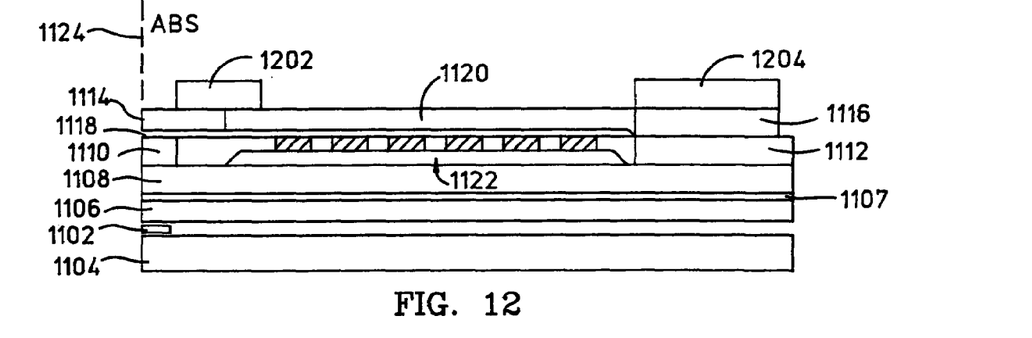
FIG. 12 is the second in a series of five illustrations of FIGS. 11–15 which describe the inventive method of making the magnetic head, showing front and back gap connecting pedestals which were electroplated over front and back gap P2 pedestals.

Next, in FIG. 12, front and back gap connecting pedestals 1202 and 1204 are electroplated over the structure of FIG. 11. More particularly, front connecting pedestal 1202 is formed slightly behind ABS line 1124 over a top portion of front P2 pole tip 1114 and over a top portion of insulator layer 1120, as shown. Back gap connecting pedestal 1204 is formed over back gap P2 pedestal 1116 in the back gap region. Connecting pedestals 1202 and 1204 may be made of any suitable magnetic material, preferably one with a high magnetic moment, such as various compositions of NiFe alloys or CoFe alloys, with the inclusion of other common additives or dopants to control its material properties. The thickness or height of front and back gap connecting pedestals 1202 and 1204 is preferably between about 0.2–2.0 µm, and in the present embodiment has a particular thickness of about 1 µm. The width of front connecting pedestal 1202 is preferably greater than 2 µm. Front connecting pedestal 1202 may be recessed behind ABS line 1124 between about 0.05–2.0 µm, and in the present embodiment is recessed by about 1 µm.

Figure 13:
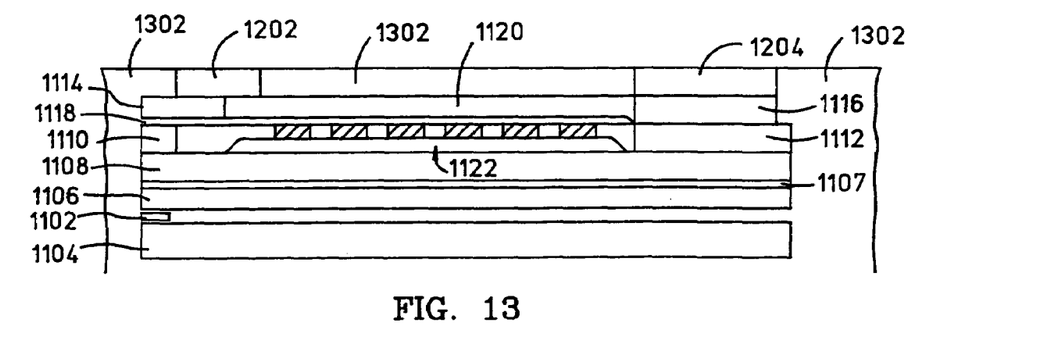
FIG. 13 is the third in a series of five illustrations of FIGS. 11–15 which describe the inventive method of making the magnetic head, showing an insulator material deposited around the front and back gap connecting pedestals.

Another insulator (not shown in FIG. 12), which may be alumina or other suitable insulative material, is then deposited over connecting pedestals 1202 and 1204, insulator layer 1120, and over and around front P2 pole tip 1114. Next, a CMP is performed on the top surface of this structure to remove top insulator materials and to expose the tops of connecting pedestals 1202 and 1204. The resulting structure is shown in FIG. 13, where the top surfaces of connecting pedestals 1202 and 1204 and a resulting insulator layer 1302 are coplanar. At this point in the process, front P2 pole tip 1114 is well-protected by insulator 1302.

Figure 14:
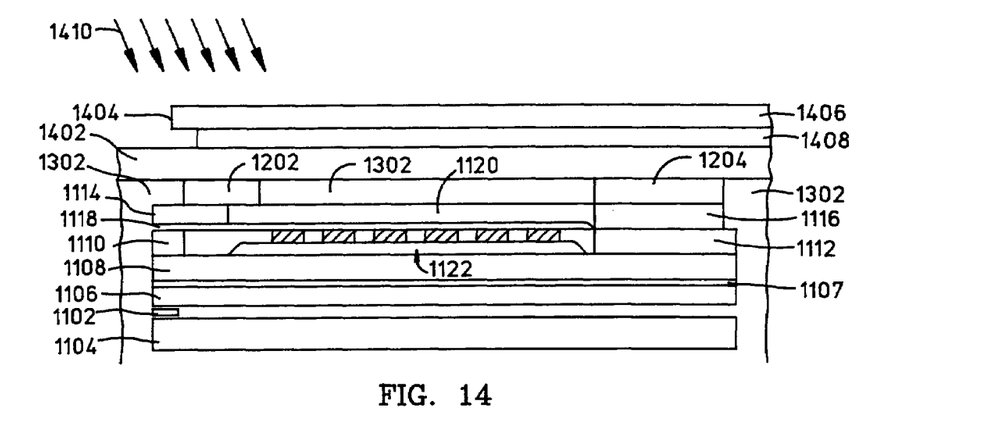
FIG. 14 is the fourth in a series of five illustrations of FIGS. 11–15 which describe the inventive method of making the magnetic head, showing yoke layer materials formed over the structure of FIG. 13 by sputter deposition, a photoresist mask formed over the yoke layer materials, and an ion milling process to remove a front portion of the yoke layer materials.

In FIG. 14, yoke layer materials 1402 are then formed over the entire structure of FIG. 13. Yoke layer materials 1402 are typically made of either highly resistive magnetic materials, such as cobalt-zirconium-tantalum (CoZrTa), or laminated materials made of alternating magnetic and dielectric layers. As one example of a highly resistive material, cobalt-zirconium-tantalum (CoZrTa) has a resistance that is about five times the resistance of $Ni_{80}Fe_{20}$ which is a commonly used yoke material. Such materials are chosen to reduce or break up the effect of eddy currents which otherwise cause a relatively large loss of efficiency at high data rate performance. The selection of these materials permits them to be sputter deposited over the structure. Due to the full-film sputter deposition, yoke layer materials 1402 may be shaped by ion milling or other suitable process.

Before ion milling, a photoresist mask 1404 is formed over yoke layer materials 1402. The front edge of photoresist mask 1404 is positioned such that it is recessed away from the ABS as shown. In this embodiment, photoresist mask 1404 is made of a top photoresist layer 1406 and a bottom release layer 1408 (such as PMGI). Photoresist mask 1404 may be recessed about 0.2–2.0 µm away from the ABS. An ion milling process is then performed as indicated by arrows 1410 to remove the front portion of yoke layer materials 1402.

To guarantee that the uncovered yoke layer materials 1402 are sufficiently removed, "over-milling" from between about 10–50% may be required. Due to the shadowing effect from photoresist mask 1404, it may also take additional time to clean materials at the foot of photoresist mask 1402. However, this additional ion milling will not structurally affect the front P2 pole tip 1114, but will rather merely reduce the size of insulator materials 1302 which surround front P2 pole tip 1114. The ion milling may continue until only a small remaining portion of insulator materials 1302 around front P2 pole tip 1114 remains.

Figure 15:
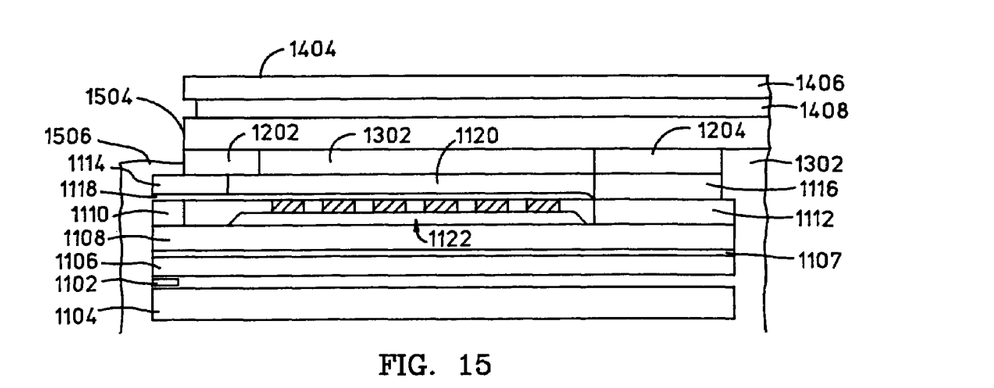
FIG. 15 is the final illustration of a series of five illustrations of FIGS. 11–15 which describe the inventive method of making the magnetic head, showing the removed front portion of the yoke layer materials to form the yoke, and a resulting magnetic head of the present invention.

In FIG. 15, a portion of yoke layer materials is shown removed from the ion milling process. A yoke 1504 is thereby formed over the front and back gap connecting pedestals 1202 and 1204. From the further ion milling, a small portion of insulator materials 1506 may remain formed around front P2 pole tip 1114. Photoresist mask 1404 may be removed by dissolving photoresist layer 1406 and release layer 1408 with a suitable solvent The method may continue using conventional head processing to complete the formation of the head.

Thus, the layer comprised of front connecting pedestal 1204 and insulator 1302 shields the front P2 pole tip 1114 from the ion mill of the yoke while providing a necessary connection of the pole pieces at the back gap. With the present invention, it is no longer difficult to control the thickness of the P2 pole piece, and the head's write performance will not be adversely affected. The resulting magnetic head has a first P1 pole piece; a second P2 pole piece which has a front P2 pole tip and a back gap P2 pedestal; a gap layer which separates the first P1 pole piece and the second P2 pole piece at the ABS; front and back gap connecting pedestals formed on the front P2 pole tip and the back gap P2 pedestal, respectively; insulator materials formed in between the front and the back gap connecting pedestals; and a yoke formed over the front and the back gap connecting pedestals for connecting together the front P2 pole tip and the back gap P2 pedestal at the back gap. The yoke is preferably made of a highly resistive magnetic material or a laminated structure of alternating magnetic and dielectric layers.

FIGS. 16–21 are cross-sectional views of partially constructed magnetic heads for describing an alternative inventive method of making a magnetic head. The method of FIGS. 16–21 may be utilized for making a magnetic head in the disk drive described above in relation to FIGS. 4–10. With this method, the front and the back gap connecting pedestals utilized in the method of FIGS. 11–15 are not needed.

Figure 16:
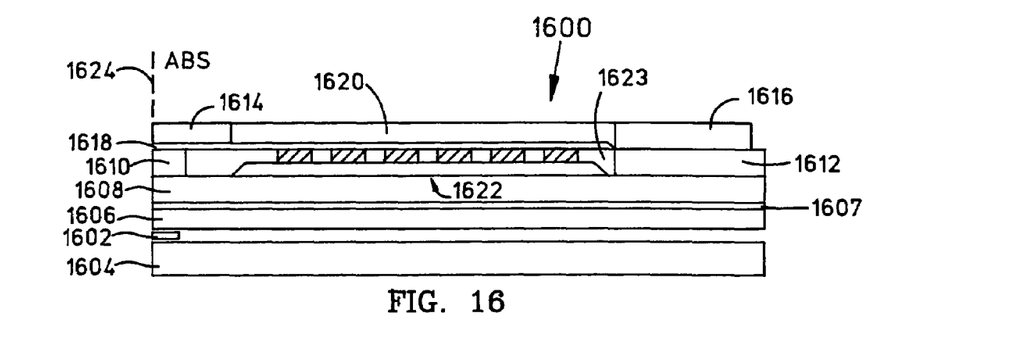
FIG. 16 is the first in a series of six illustrations of FIGS. 16–21 which describe an alternative method of making a magnetic head which forms the yoke without affecting the P2 pole piece.

The method begins with FIG. 16 which shows a partially constructed magnetic head 1600 made in the same manner as that described above in relation to FIG. 11. Magnetic head 1600 of FIG. 16 has a read sensor 1602 formed between first and second shield layers 1604 and 1606. A first pole piece layer ("P1") 1608 is plated over an insulator layer 1607 which is on top of second shield layer 1606. A front P1 pedestal 1610 is plated over first pole piece layer 1608 at an ABS line 1624, and a back gap P1 pedestal 1612 is plated over first pole piece 1608 at the back gap. Write coils 1622 are formed between P1 pedestals 1610 and 1612 on top of and surrounded by insulator materials 1623. A gap layer 1618 is formed over a top surface of front P1 pedestal 1610 and insulator 1623. A front P2 pole tip 1614 is plated over gap layer 1618 at ABS line 1624, and a back gap P2 pedestal 1616 is plated over back gap P1 pedestal 1612 at the back gap. An insulator 1620 is formed between P2 pedestals 1614 and 1616 to form a coplanar top surface therewith.

Figure 17:
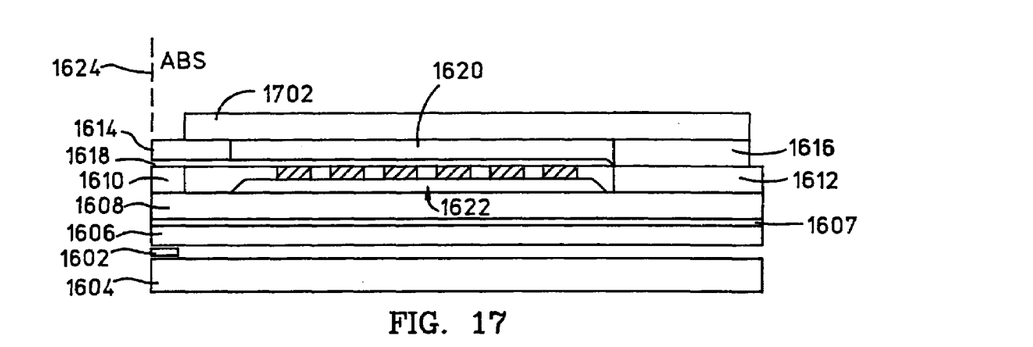
FIG. 17 is the second in a series of six illustrations of FIGS. 16–21 which describe the alternative method of making the magnetic head, showing a selectively etchable material formed over the structure of FIG. 16.

In FIG. 17, a selectively etchable material 1702 is electroplated over the top of the structure of FIG. 16, such that its front edge is slightly recessed away from ABS line 1624. Selectively etchable material 1702 may be made of any suitable material that can be selectively etched without affecting underlying layers such as front P2 pole tip 1614. For example, selectively etchable material 1702 may be copper (Cu). Selectively etchable material 1702 may be plated to a thickness of between 0.5 and 3.0 µm. Other materials, such as photoresist or silicon-dioxide ($SiO_2$), which can be selectively etched by reactive ion etching (RIE), may alternatively be used.

Figure 18:
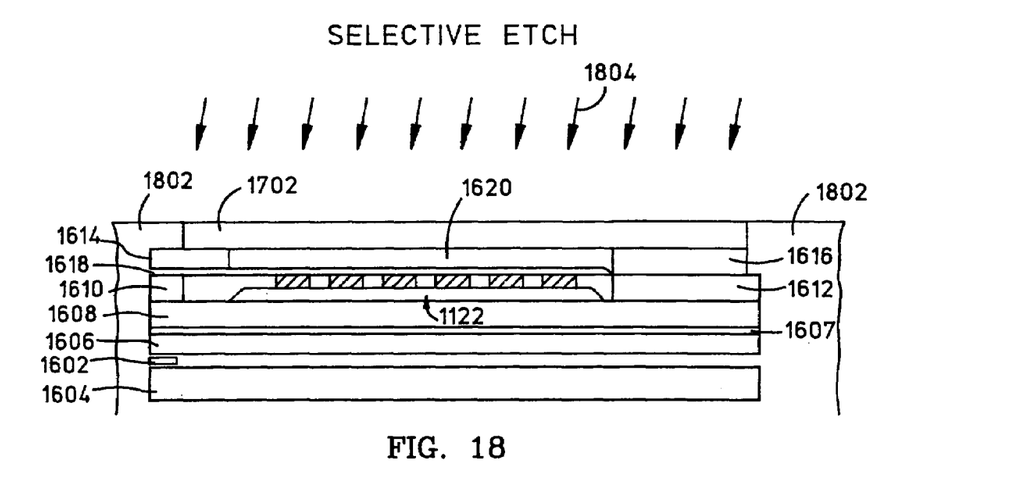
FIG. 18 is the third in a series of six illustrations of FIGS. 16–21 which describe the alternative method of making the magnetic head, showing an insulator which surrounds the selectively etchable material and an etching process to remove the selectively etchable material.
Figure 19:
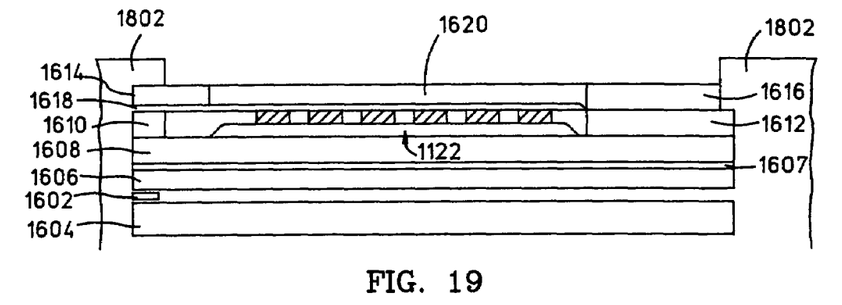
FIG. 19 is the fourth in a series of six illustrations of FIGS. 16–21 which describe the alternative method of making the magnetic head, showing the resulting structure after removal of the selectively etchable material.

In FIG. 18, another insulator (not shown in FIG. 18), which may be alumina or other suitable insulative material, is then deposited over selectively etchable material 1702 and over and around front P2 pole tip 1614. Next, a CMP is performed on the top surface of this structure to remove top insulator materials and to expose the top of selectively etchable material 1702. The resulting structure is shown in FIG. 18, where the top surfaces of selectively etchable material 1702 and a resulting insulator layer 1802 are coplanar. Next, selectively etchable material 1702 is removed using a suitable wet etching or dry etching process as indicated by arrows 1804. The resulting structure is shown in FIG. 19. If selectively etchable material 1702 is copper, for example, then a suitable wet etchant to remove selectively etchable material 1702 is an ammonium-based alkaline solution with an oxidizing agent. As another example, if selectively etchable material 1702 is photoresist or silicon-dioxide ($SiO_2$), then a reactive ion etch (RIE) may be performed to remove the selectively etchable material 1702. The RIE may utilize any suitable etch gas, such as one containing fluorine (e.g., $CHF_3$, $C_3F_8$, or $CF_4$) or carbon-dioxide ($CO_2$). Other suitable etchants or etch processes may be utilized as well.

Figure 20:
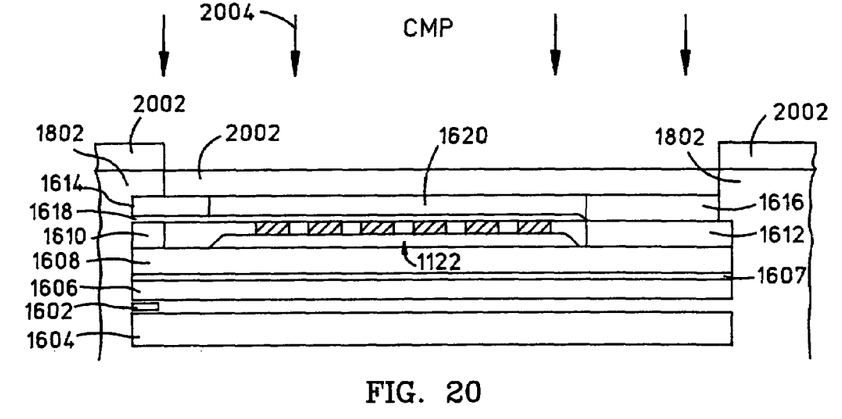
FIG. 20 is the fifth in a series of six illustrations of FIGS. 16–21 which describe the alternative method of making the magnetic head, showing yoke layer materials formed over the structure of FIG. 19.
Figure 21:
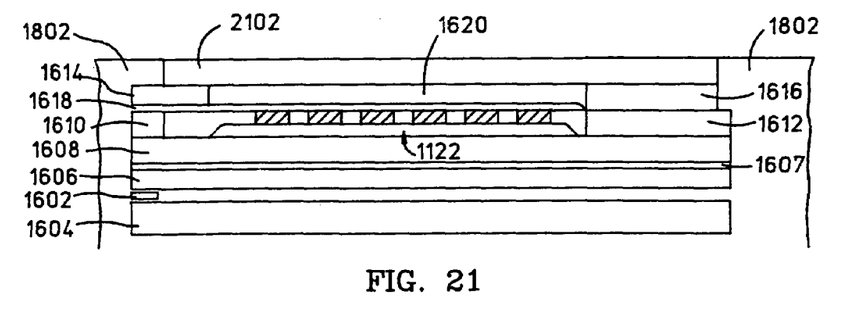
FIG. 21 is the final illustration of a series of six illustrations of FIGS. 16–21 which describe the alternative method of making the magnetic head, showing the resulting yoke after a chemical-mechanical polishing (CMP) of the structure of FIG. 20.

In FIG. 20, yoke layer materials 2002 are then formed over the entire structure of FIG. 19. Yoke layer materials 2002 are made of either highly resistive magnetic materials, such as cobalt-zirconium-tantalum (CoZrTa), or laminated materials made of alternating magnetic and dielectric layers. As one example of a highly resistive material, cobalt-zirconium-tantalum (CoZrTa) has a resistance that is about five times the resistance of $Ni_{80}Fe_{20}$, which is a commonly used yoke material. Such materials are chosen to reduce or break up the effect of eddy currents which otherwise cause a relatively large loss of efficiency at high data rate performance. The selection of these materials requires them to be sputter deposited over the structure. As shown, yoke layer materials 2002 are raised higher over front P2 pole tip and at the back gap than over write coils 1122. Next, a chemical-mechanical polishing (CMP) is performed over the top of the structure (as indicated by arrows 2004) to remove front and back gap portions of yoke layer materials 2002. The CMP may also remove top portions of insulator 1802 as well. The resulting structure is shown in FIG. 21, which has a newly formed yoke 2102. Advantageously, the yoke is formed without the ion milling process which may alter the structure of the front P2 pole tip. The method may continue using conventional head processing to complete the formation of the head.

Thus, a method of making a unique magnetic head which protects the front P2 pole tip during the ion mill patterning of the yoke has been described along with an alternative method of forming the yoke. A front connecting pedestal is electroplated over the front P2 pole piece slightly behind the ABS, and a back gap connecting pedestal is electroplated over the back gap P2 pedestal. Insulator materials are then formed over the front P2 pole tip, over the front connecting pedestal, and in between the front and back gap connecting pedestals. Next, a chemical-mechanical polish (CMP) over the top of the structure forms a substantially planar top surface. A full-film of yoke layer materials is then sputter deposited over this top surface, followed by the formation of a photoresist mask slightly behind the ABS. When the yoke layer materials are subsequently ion milled to form the yoke, the front P2 pole tip is protected by the surrounding insulator. The front and back gap connecting pedestals form an intervening magnetic layer which connects the front and back gap P2 pedestals to the yoke. The inventive magnetic head which results from this process has a first P1 pole piece; a second P2 pole piece which has a front P2 pole tip and a back gap P2 pedestal; a gap layer which separates the first P1 pole piece and the second P2 pole piece at an air bearing surface (ABS); front and back gap connecting pedestals formed on the front P2 pole tip and the back gap P2 pedestal, respectively; insulator materials formed in between the front and the back gap connecting pedestals; and a yoke formed over the front and the back gap connecting pedestals for connecting together the front P2 pole tip and the back gap P2 pedestal. The yoke is preferably a highly resistive magnetic material or a laminated structure of alternating magnetic and dielectric layers.

It is to be understood that the above is merely a description of preferred embodiments of the invention and that various changes, alterations, and variations may be made without departing from the true spirit and scope of the invention as set for in the appended claims. None of the terms or phrases in the specification and claims has been given any special particular meaning different from the plain language meaning to those skilled in the art, and therefore the specification is not to be used to define terms in an unduly narrow sense.

What is claimed is:

1. A method of making a magnetic head, comprising:
providing a partially constructed magnetic head which has a top surface formed by a front pole tip, a back gap pedestal, and insulator materials disposed between the front pole tip and the back gap pedestal;
forming a layer of selectively etchable materials over the top surface of the partially constructed magnetic head, the layer having a front edge that is recessed away from an air bearing surface (ABS);
forming additional insulator materials over the selectively etchable material layer and over a front portion of the front pole tip;
performing a chemical-mechanical polishing (CMP) to form a substantially coplanar top surface with the selectively etchable material layer and the additional insulator materials;
etching to remove the selectively etchable material layer;
depositing yoke layer materials over the entire structure; and
performing a chemically-mechanically polishing (CMP) to form a substantially coplanar top surface with the yoke layer materials and the additional insulator materials, to thereby form a yoke.

2. The method of claim 1, wherein the yoke of the magnetic head comprises a highly resistive magnetic material.

3. The method of claim 1, wherein the yoke of the magnetic head comprises a laminated structure of alternating magnetic and dielectric layers.

4. The method of claim 1, wherein the act of forming the layer of selectively etchable materials comprises the further act of electroplating the selectively etchable material layer.

5. The method of claim 1, wherein the act of etching to remove the selectively etchable material layer comprises wet etching.

6. The method of claim 1, wherein the selectively etchable material layer comprises copper, and the act of etching to remove the selectively etchable material layer comprises wet etching.

7. The method of claim 1, wherein the act of etching to remove the selectively etchable material layer comprises a reactive ion etch (RIE).

8. A method of making a magnetic head, comprising:
forming a layer of selectively etchable materials over a top surface of a partially constructed magnetic head which includes a front pole tip, the layer having a front edge that is recessed away from an air bearing surface (ABS);

forming insulator materials over at least a portion of the front pole tip;

etching to remove the selectively etchable material layer; and depositing yoke layer materials over the front pole tip and the insulating materials.

9. The method of claim 8, further comprising:

performing a chemical-mechanical polishing (CMP) to form a substantially coplanar top surface with the selectively etchable material layer and the insulator materials.

10. The method of claim 8, wherein in forming the insulator materials over the portion of the front pole tip, the method further comprises:

depositing insulator materials over the portion of the front pole tip and the selectively etchable materials; and performing a chemical-mechanical polishing (CMP) to form a substantially coplanar top surface with the selectively etchable material layer and the deposited insulator materials.

11. The method of claim 8, further comprising:

performing a chemically-mechanically polishing (CMP) to form a substantially coplanar top surface with the yoke layer materials and the insulator materials, to thereby form a yoke.

12. The method of claim 8, further comprising:

performing a chemically-mechanically polishing (CMP) to form a substantially coplanar top surface with the yoke layer materials and the insulator materials, to thereby form a yoke; and wherein the yoke of the magnetic head comprises a highly resistive magnetic material.

13. The method of claim 8, further comprising:

performing a chemically-mechanically polishing (CMP) to form a substantially coplanar top surface with the yoke layer materials and the insulator materials, to thereby form a yoke; and wherein the yoke of the magnetic head comprises a laminated strncture of alternating magnetic and dielectric layers.

14. The method of claim 8, wherein the act of forming the layer of selectively etchable materials comprises the further act of electroplating the selectively etchable material layer.

15. The method of claim 8, wherein the act of etching to remove the selectively etchable material layer comprises wet etching.

16. The method of claim 8, wherein the selectively etchable material layer comprises copper, and the act of etching to remove the selectively etchable material layer comprises wet etching.

17. The method of claim 8, wherein the act of etching to remove the selectively etchable material layer comprises a reactive ion etch (RIE).

* * * * *